US012570787B2

(12) United States Patent (10) Patent No.: US 12,570,787 B2

Reddy et al. (45) Date of Patent: Mar. 10, 2026

(54) CURABLE COMPOSITIONS AND ARTICLES PREPARED THEREFROM

(71) Applicant: Transitions Optical, Ltd., Tuam (IE)

(72) Inventors: Ramaiahgari Reddy, Murrysville, PA (US); Anil Kumar, Murrysville, PA (US); Yannian Li, Solon, OH (US)

(73) Assignee: Transitions Optical, Ltd., Tuam (IE)

( * ) Notice: Subject to any disclaimer, the term of this patent is extended or adjusted under 35 U.S.C. 154(b) by 114 days.

(21) Appl. No.: 18/042,802

(22) PCT Filed: Aug. 27, 2020

(86) PCT No.: PCT/EP2020/073950

§ 371 (c)(1),
(2) Date: Feb. 24, 2023

(87) PCT Pub. No.: WO2022/042841

PCT Pub. Date: Mar. 3, 2022

(65) Prior Publication Data

US 2023/0323011 A1 Oct. 12, 2023

(51) Int. Cl.

| | |
|---|---|
| *C08G 18/44* | (2006.01) |
| *C08G 18/62* | (2006.01) |
| *C08G 18/64* | (2006.01) |
| *C08G 64/00* | (2006.01) |
| *C08J 7/04* | (2020.01) |
| *C08K 5/00* | (2006.01) |

(52) U.S. Cl.

CPC ......... *C08G 18/44* (2013.01); *C08G 18/6225* (2013.01); *C08G 18/6415* (2013.01); *C08G 64/00* (2013.01); *C08J 7/0427* (2020.01); *C08K 5/0041* (2013.01); *C08G 2170/00* (2013.01); *C08J 2375/06* (2013.01)

(58) Field of Classification Search

CPC .......................... C08G 18/755; C08G 18/5045; C08G 18/622; C08G 18/44; C08J 7/043; C08J 2300/24

See application file for complete search history.

(56) References Cited

U.S. PATENT DOCUMENTS

| 5,645,767 A | 7/1997 | Van Gemert | |
|---|---|---|---|
| 5,658,501 A | 8/1997 | Kumar et al. | |
| 5,777,061 A | 7/1998 | Yonek et al. | |
| 5,962,617 A | 10/1999 | Slagel | |
| 7,410,691 B2 | 8/2008 | Blackburn et al. | |
| 7,576,157 B2 | 8/2009 | Pajerski | |
| 9,028,728 B2 | 5/2015 | Bancroft et al. | |
| 9,234,984 B2 | 1/2016 | Hiraren et al. | |
| 10,526,533 B2 | 1/2020 | Shimizu et al. | |
| 2008/0027168 A1* | 1/2008 | Pajerski | C08G 18/0823 524/591 |
| 2008/0028985 A1* | 2/2008 | Shindo | C08G 18/632 106/287.23 |
| 2011/0098394 A1* | 4/2011 | Schmeltzer | C09D 183/04 524/588 |

FOREIGN PATENT DOCUMENTS

| CN | 103080269 A | 5/2013 |
|---|---|---|
| CN | 106433608 A | 2/2017 |
| CN | 107207851 A | 9/2017 |
| EP | 0392710 A1 | 10/1990 |
| GB | 947585 A | 1/1964 |
| WO | 2008016843 A1 | 2/2008 |
| WO | 2017030545 A1 | 2/2017 |
| WO | 2019029794 A1 | 2/2019 |

OTHER PUBLICATIONS

Desmodur BL-3272 Specification, published on Jun. 2018.*

* cited by examiner

*Primary Examiner* — Gregory Listvoyb

(74) *Attorney, Agent, or Firm* — The Webb Law Firm

(57) ABSTRACT

The invention relates to a curable composition including (a) a component having one or more carbonyl group-containing compounds having a number average molecular weight (Mn) of at least 500 g/mole, wherein each carbonyl group is independently a ketone group or an aldehyde group; (b) a polyamine compound having at least two primary amine groups per molecule; and (c) a polyisocyanate compound. Articles coated with the curable composition are also provided.

13 Claims, No Drawings

CURABLE COMPOSITIONS AND ARTICLES PREPARED THEREFROM

CROSS-REFERENCE TO RELATED APPLICATION

This application is the United States national phase of International Application No. PCT/EP2020/073950 filed Aug. 27, 2020, the disclosure of which is hereby incorporated by reference in its entirety.

BACKGROUND OF THE INVENTION

Field of the Invention

The present invention relates to curable compositions, such as curable photochromic compositions which include a photochromic compound. Articles prepared from such compositions are also provided.

Description of Related Art

In response to certain wavelengths of electromagnetic radiation (or "actinic radiation"), photochromic compounds, such as indeno-fused naphthopyrans, typically undergo a transformation from one form or state to another form, with each form having a characteristic or distinguishable absorption spectrum associated therewith. Typically, upon exposure to actinic radiation, many photochromic compounds are transformed from a closed-form, which corresponds to an unactivated (or bleached, e.g., substantially colorless) state of the photochromic compound, to an open-form, which corresponds to an activated (or colored) state of the photochromic compound. In the absence of exposure to actinic radiation, such photochromic compounds are reversibly transformed from the activated (or colored) state, back to the unactivated (or bleached) state. Compositions that contain photochromic compounds typically display colorless (e.g., clear) and colored states that correspond to the colorless and colored states of the photochromic compounds contained therein. Articles, such as optical lenses, that contain photochromic compounds or have photochromic compounds applied thereto (e.g., in form of a photochromic coating composition) typically display colorless (e.g., clear) and colored states that correspond to the colorless and colored states of the photochromic compounds contained therein or applied thereto.

Photochromic compounds can be used in curable compositions to form, for example, cured layers, such as cured films, adhesives, or sheets that are photochromic. With cured photochromic films, such as cured photochromic coatings, it is typically desirable that they provide a combination of hardness and photochromic performance. Generally, the kinetics associated with the reversible transformation of a photochromic compound between a closed-form (unactivated/colorless) and an open-form (activated/colored) is faster in a soft matrix, but slower in a hard matrix (of the cured film in which the photochromic compound resides). Cured photochromic films having a soft matrix typically have reduced hardness, while those having a hard matrix typically have increased hardness. Although a harder matrix can provide desirable mechanical properties such as scratch resistance, photochromic properties are typically compromised, resulting in undesirable properties such as slow fade rate.

It would be desirable to develop curable compositions, especially curable photochromic compositions that provide cured photochromic layers having improved hardness without a reduction in photochromic performance.

SUMMARY OF THE INVENTION

The present invention provides a curable composition comprising: (a) a component comprising one or more carbonyl group-containing compounds having a number average molecular weight (Mn) of at least 500 g/mole, wherein each carbonyl group is independently a ketone group or an aldehyde group; (b) a polyamine compound having at least two primary amine groups per molecule; and (c) a polyisocyanate compound.

The invention also provides coated articles comprising a substrate and a cured coating layer over at least a portion of the substrate, wherein the cured coating layer is formed from the curable composition.

DESCRIPTION OF THE INVENTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or sub-ratios subsumed therein. For example, a stated range or ratio of "1 to 10" should be considered to include any and all subranges between (and inclusive of) the minimum value of 1 and the maximum value of 10; that is, all subranges or sub-ratios beginning with a minimum value of 1 or more and ending with a maximum value of 10 or less, such as but not limited to 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester", means methacrylates and/or acrylates. For example, unless specified otherwise herein, the term "(meth)acrylic acid" includes methacrylic acid and/or acrylic acid.

As used herein, the term "photochromic" and similar terms, such as "photochromic compound", means a compound or material having an absorption spectrum for at least visible radiation that varies in response to absorption of at least actinic radiation. Further, as used herein, the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state.

As used herein, the term "photochromic-dichroic" and similar terms, such as photochromic-dichroic compound", means possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other) which also vary in response to at least actinic radiation.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, the photochromic compounds of the present invention can have a different absorption spectrum in each of the first and second states. For example, while not limiting herein, a photochromic compound of the present invention can be clear in the first state and colored in the second state. Alternatively, a photochromic compound of the present invention can have a first color in the first state and a second color in the second state.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including, without limitation, contact lenses, intra-ocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive and aircraft transparencies, windshields, filters, shutters, and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to various orientations of the invention as may be described further herein, such as articles and multilayer articles of the present invention. It is to be understood, however, that the invention can assume various alternative orientations to those described herein and, accordingly, such terms are not to be considered as limiting.

As used herein, the terms "formed over", "deposited over", "provided over", "applied over", "residing over", or "positioned over", mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include a methylene group or a methyl group; groups that are linear, such as linear $C_2$-$C_{20}$ alkyl groups; and groups that are appropriately branched, such as branched $C_3$-$C_{20}$ alkyl groups.

As used herein, recitations of "optionally substituted" group means a group including, but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to, alkyl; alkenyl; alkynyl; cycloalkyl, including poly-fused-ring cycloalkyl and polycycloalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as —N($R_{11}$')($R_{12}$') where $R_{11}$' and $R_{12}$' are each independently selected from hydrogen, linear or branched $C_1$-$C_{20}$ alkyl, $C_3$-$C_{12}$cycloalkyl, $C_3$-$C_{12}$ heterocycloalkyl, aryl, and heteroaryl.

As used herein, recitations of "halo substituted" and related terms (such as, but not limited to, haloalkyl groups, haloalkenyl groups, haloalkynyl groups, haloaryl groups and halo-heteroaryl groups) means a group in which at least one, and up to and including all of the available hydrogen groups thereof, is substituted with a halo group. The term "halo-substituted" is inclusive of "perhalo-substituted". As used herein, the term perhalo-substituted group and related terms (such as but not limited to perhaloalkyl groups, perhaloalkenyl groups, perhaloalkynyl groups, perhaloaryl groups and perhalo-heteroaryl groups) means a group in which all of the available hydrogen groups thereof are substituted with a halo group. For example, perhalomethyl is —$CX_3$; perhalophenyl is —$C_6X_5$, where X represents one or more halo groups, such as but not limited to F.

Representative alkyl groups include, but are not limited to, methyl, ethyl, propyl, isopropyl, butyl, isobutyl, sec-butyl, tert-butyl, pentyl, neopentyl, hexyl, heptyl, octyl, nonyl and decyl. Representative alkenyl groups include, but are not limited to, vinyl, allyl and propenyl. Representative alkynyl groups include, but are not limited to, ethynyl, 1-propynyl, 2-propynyl, 1-butynyl, and 2-butynyl. Representative cycloalkyl groups include, but are not limited to, cyclopropyl, cyclobutyl, cyclopentyl, cyclohexyl, and cyclooctyl substituents. Representative heterocycloalkyl groups include, but are not limited to, imidazolyl, tetrahydrofuranyl, tetrahydropyranyl and piperidinyl. Representative aryl groups include, but are not limited to, phenyl, naphthyl, anthracynyl and triptycenyl. Representative heteroaryl groups include, but are not limited to, furanyl, pyranyl, pyridinyl, isoquinoline, and pyrimidinyl. Representative aralkyl groups include, but are not limited to, benzyl, and phenethyl.

The term "alkyl" as used herein means linear or branched alkyl, such as but not limited to linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from include, but are not limited to, those recited previously herein. The term "cycloalkyl" as used herein means groups that are appropriately cyclic, such as but not limited to $C_3$-$C_{12}$cycloalkyl (including, but not limited to, cyclic $C_5$-$C_7$ alkyl) groups. Examples of cycloalkyl groups include those recited previously herein. The term "cycloalkyl" as used herein also includes bridged ring polycycloalkyl groups (or bridged ring polycyclic alkyl groups), such as but not limited to bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein means groups that are appropriately cyclic, such as but not limited to $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, those recited previously herein. The term "heterocycloalkyl" as used herein also includes bridged ring polycyclic heterocycloalkyl groups, such as but not limited to 7-oxabicyclo[2.2.1]heptanyl; and fused ring polycyclic heterocycloalkyl groups, such as but not limited to octahydrocyclopenta[b]pyranyl, and octahydro-1H-isochromenyl.

The term "heteroaryl" as used herein includes, but is not limited to, $C_2$-$C_{18}$ heteroaryl, such as but not limited to $C_2$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, those recited previously herein. The term "aralkyl" as used herein includes, but is not limited to, $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein.

As previously mentioned, the present invention is directed to a curable composition comprising (a) a component comprising one or more carbonyl group-containing compounds having a number average molecular weight (Mn) of at least 500 g/mole, wherein each carbonyl group is independently a ketone group or an aldehyde group; (b) a polyamine compound having at least two primary amine groups per molecule; and (c) a polyisocyanate compound.

Component (a) comprises one or more carbonyl group-containing compounds. The one or more carbonyl group-containing compounds have a number average molecular weight (Mn) of at least 500 g/mole, such as at least 800 g/mole, or at least 1,000 g/mole, or at least 1,500 g/mole. The one or more carbonyl group-containing compounds can have a Mn of 120,000 g/mole or less, such as 80,000 g/mole or less, or 60,000 g/mole or less, or 50,000 g/mole or less. The Mn of the one or more carbonyl group-containing compounds can range between any of the recited values, inclusive of the recited values.

The carbonyl groups comprising the compounds comprising component (a) are each independently a ketone group or an aldehyde group. That is, component (a) can comprise one or more compounds comprising one or more ketone groups; one or more compounds comprising one or more aldehyde groups; one or more compounds comprising both one or more ketone groups and one or more aldehyde groups; or mixtures of any of the foregoing.

For purposes of the present invention, reference to "carbonyl groups" includes ketone and aldehyde groups, and is intended to exclude other functional groups comprising C=O units such as esters, carbonates, urethanes (carbamates), amides, ureas and the like. Likewise, associated equivalent weights refer to the equivalent weight of the sum of ketone and aldehyde groups and excludes the abovementioned functional groups.

The component (a) can comprise (i) a compound having 1 to 4 carbonyl groups per molecule and an equivalent weight of 500 to 30,000 g/mole; or (ii) a compound having 2 or more carbonyl groups per molecule and an equivalent weight of 130 to 480 g/mole; or (iii) a mixture of (i) and (ii).

The compound (i) having 1 to 4 carbonyl groups per molecule and an equivalent weight of 500 to 30,000 g/mole can be selected from the group consisting of carbonyl group-containing polycarbonates, carbonyl group-containing polyethers, carbonyl group-containing polyesters, carbonyl group-containing polyurethanes, copolymers thereof, and mixtures thereof.

The carbonyl functional polycarbonates, suitable for use as the compound (i) having 1 to 4 carbonyl groups per molecule and an equivalent weight of 500 to 30,000 g/mole can be prepared in accordance with art recognized methods. For purposes of non-limiting illustration, the carbonyl functional polycarbonates suitable for use as the compound (i) having 1 to 4 carbonyl groups per molecule and an equivalent weight of 500 to 30,000 g/mole can be prepared by first preparing a hydroxyl or isocyanate functional polycarbonate intermediate, and then modifying the polycarbonate intermediate to include carbonyl groups. The art-recognized methods for preparing carbonyl group containing materials from hydroxyl or isocyanate functional intermediates, are as follows. The hydroxyl functional intermediate can be reacted with a ketone or aldehyde group containing aliphatic or aromatic carboxylic acids, such as, but not limited to, levulinic acid, 4-acetylbenzoic acid, 4-formylbenzoic acid, which results in the formation of a carbonyl functional material. Also, the hydroxyl functional intermediate can be reacted with a tert-butyl acetoacetate, to form a ketone functional material. Further, the isocyanate functional intermediate may be prepared first and then reacted with a hydroxyl-functional aliphatic or aromatic ketone or aldehyde, such as but not limited to a 4-hydroxy-4-methyl-2-pentanone, optionally using a catalyst, followed by art-recognized work up procedures, which results in the formation of a carbonyl functional material.

Commercially available hydroxyl functional polycarbonates that can be used as intermediates in the formation of carbonyl functional polycarbonates suitable for use as the compound (i) having 1 to 4 carbonyl groups per molecule and an equivalent weight of 500 to 30,000 g/mole, can include, but are not limited to, commercially available polycarbonate diols such as those commercially available under the trade name of ETERNACOLL®. Other suitable polycarbonate polyols are commercially available from Asahi Kasei, under the trade name of DURANOL™, such as DURANOL T5652 polycarbonate diol, and PC-1122 polycarbonate diol from Stahl, USA.

The carbonyl functional polyethers suitable for use as the compound (i) having 1 to 4 carbonyl groups per molecule and an equivalent weight of 500 to 30,000 g/mole can be prepared in accordance with art-recognized methods. For purposes of non-limiting illustration, suitable carbonyl functional polyethers can be prepared by first preparing a polyether intermediate having hydroxyl or isocyanate functionality, and then modifying the polyether intermediate to include carbonyl groups.

Non-limiting examples of suitable polyether polyols include polyoxyalkylene polyols and polyalkoxylated polyols, such as, for example, poly(oxyalkylene)polyols. Examples of polyoxyalkylene polyols can include, but are not limited to, diols such as polyoxyethylene diols (i.e., polyethylene glycol) with a molecular weight of greater than 1000, polyoxypropylene diols (i.e., polypropylene glycol) with a molecular weight of greater than 1000, polytetramethylene ether glycol, and combinations thereof. Non-limiting examples of commercially available polyether polyols include those available from Dow Chemicals under the VORANOL™ trade name, from BASF under the LUPRANOL®, PLURACOL®, PLURONIC®, and PolyTHF® trade names, and from Bayer under the DESMOPHEN® and ACCLAIM® trade names.

The carbonyl functional polyesters suitable for use as the compound (i) having 1 to 4 carbonyl groups per molecule and an equivalent weight of 500 to 30,000 g/mole can be prepared in accordance with art recognized methods. Also, the carbonyl functional polyesters can be prepared by first preparing a polyester intermediate having hydroxyl or isocyanate functionality, and then modifying the polyester intermediate to include carbonyl groups.

Polyester polyols may be prepared by esterification of polyfunctional carboxylic acids with polyol.

Alternatively, polyester polyols can be prepared by the ring opening polymerization of cyclic carboxylic acid esters with polyols. Examples of cyclic carboxylic acid esters from which the hydroxyl-functional polyester can be prepared include, but are not limited to, lactones having from 4 to 8 atoms in the cyclic ring with the ester oxygen and the carbonyl carbon bonded directly to each other, such as beta-propiolactone, gamma-butyrolactone, delta valerolactone, epsilon caprolactone, and combinations of two or more thereof. Suitable examples of commercially available polyester polyols for use as the compound (i) having 1 to 4 carbonyl groups per molecule and an equivalent weight of 500 to 30,000 g/mole can include, but are not limited to, linear aliphatic polyester polyols, such as STEPANOL PC polyester polyols commercially available from Stepan Company. Also suitable are those commercially available from DIC Corporation such as OD-X-286, OD-X-102, OD-X-355, OD-X-2330, OD-X-240, OD-X-668, OD-X-21068, OD-X-2547, OD-X-2420, OD-X-2523, OD-X-2555, and OD-X-2560 polyester polyols; OD-X-2155 and OD-X-640 polycaprolactone diols; and OD-X-2586 triol. Additionally suitable are the polyester polyols commercially available from TRiiSO such as PERSTORP BOLTORN H2004 hyper branched polyester polyols; and INGEVITY CAPA polycaprolactone polyols. Suitable polyester polyols can also include polyester diols such as polycaprolactone diol. Non-limiting examples of commercially available polyester polyols also can include those available from BASF under the LUPRAPHEN® trade name, or from Evonik Industries under the DYNACOLL® trade name, or from Bayer under the DESMOPHEN® and BAYCOLL® trade names.

The carbonyl functional polyurethanes suitable for use as the compound (i) having 1 to 4 carbonyl groups per molecule and an equivalent weight of 500 to 30,000 g/mole can be prepared in accordance with art recognized methods. For purposes of non-limiting illustration, the carbonyl functional polyurethanes can be prepared by first forming a polyurethane intermediate having hydroxyl or isocyanate functionality, and then modifying the polyurethane intermediate to include carbonyl groups. The polyurethane intermediate can be prepared in accordance with art-recognized methods, such as, but not limited to, the reaction of polyols, such as diols, with polyisocyanates, such as di-isocyanates, tri-isocyanates. The polyols that can be used to prepare the polyurethane intermediate can be selected from those classes and examples of polyols recited previously herein. The polyisocyanates that can be used to prepare the polyurethane intermediate can be selected from those classes and examples of polyisocyanates recited further herein.

The carbonyl functional material suitable for use as the compound (i) also can be prepared from hydroxyl functional thermoplastic polyurethane copolymers, in accordance with art recognized methods. Commercially available hydroxyl functional thermoplastic polyurethanes that can be used as intermediates in the formation of carbonyl functional polyurethane copolymers include, but are not limited to, PEARLSTICK, PEARLBOND, ESTANE, TECOFLEX, and CARBOTHANE hydroxyl functional polyurethanes commercially available from Lubrizol; CHRONOFLEX AL, CHRONOFLEX C, CHRONOTHANE P, and CHRONOSIL hydroxyl functional polyurethanes commercially available from AdvanSource Biomaterials Corporation (Wilmington, MA); ELAST-EON hydroxyl functional polyurethanes commercially available from AorTech International Plc (Dundee, United Kingdom); and QUADRATHANE hydroxyl functional polyurethanes commercially available from Biometrics.

As previously mentioned, component (a) may also comprise (ii) a compound having 2 or more carbonyl groups per molecule and an equivalent weight of 130 to 480 g/mole.

The compound (ii) having 2 or more carbonyl groups per molecule and an equivalent weight of 130 to 480 g/mole can be prepared from poly-hydroxyl (polyol), carboxylic acid, or isocyanate functional intermediates using art recognized methods. An intermediate with two or more hydroxyl groups can be reacted with a carboxylic acid or ester containing a ketone or aldehyde group, under esterification/transesterification conditions. Non-limiting examples of ketone- or aldehyde-functional carboxylic acids include levulinic acid, 4-acetylbenzoic acid and 4-formylbenzoic acid. An example of a suitable ketone-functional carboxylic ester is tert-butyl acetoacetate.

Examples of polyols that can be reacted with carbonyl group containing acids to prepare carbonyl-functional polyesters suitable for use as the compound (ii), can include, but are not limited to, glycerin, trimethylolpropane, trimethylolethane, trishydroxyethylisocyanurate, pentaerythritol, and diols, such as pentane diol, hexane diol, etc., 4,4'-(propane-2,2-diyl)dicyclohexanol, 4,4'-methylenedicyclohexanol, neopentyl glycol, 2,2,3-trimethylpentane-1,3-diol, 1,4-dimethylolcyclohexane, 2,2,4-trimethylpentane diol, 4,4'-(propane-2,2-diyl)diphenol, 4,4'-methylenediphenol, and like polyols.

Similarly, a polyacid functional intermediate may be reacted with a hydroxyl-functional ketone or aldehyde group-containing compound under esterification conditions. Examples of multifunctional carboxylic acids useful in preparing carbonyl functional compound (ii) include, but are not limited to, benzene-1,2,4-tricarboxylic acid, hexahydrophthalic acid, cyclohexanedioic acid, isophthalic acid, terephthalic acid, maleic acid, trimesic acid, adipic acid, sebacic acid, anhydrides thereof and/or esters thereof.

A compound having 2 or more isocyanate groups may be reacted with a hydroxyl-functional aliphatic or aromatic ketone or aldehyde, such as but not limited to a 4-hydroxyl-4-methyl-2-pentanone. Examples of polyfunctional isocyanates that can be used to prepare the carbonyl functional polyurethanes include, but are not limited to, any of those described in detail herein. The compound (ii) having 2 or more carbonyl groups per molecule and an equivalent weight of 130 to 480 g/mole also can comprise a poly(meth)acrylate copolymer. The poly(meth)acrylate copolymer may be formed by polymerization of a mixture of ethylenically unsaturated compounds including at least one ethylenically unsaturated monomer that comprises at least one ketone or aldehyde group and at least one unsaturated monomer having no ketone or aldehyde group (that is, free of carbonyl functionality).

The at least one ethylenically unsaturated monomer that comprises at least one ketone or aldehyde group may be present in an amount of from 40 mole percent and up to 90 mole percent of the total ethylenically unsaturated monomers to achieve the desired equivalent weight range. Examples of ethylenically unsaturated monomers that comprise at least one ketone or aldehyde group useful in preparing the compound (ii) can include, but are not limited to: diacetone (meth)acrylamide; acetoacetoxyethyl (meth)acrylate; vinyl acetoacetate; 2-Propenoic acid, 3-oxobutyl ester; 2-Propenoic acid, 3-oxopentyl ester; 2-Propenoic acid, 2-methyl-, 3-oxobutyl ester; 2-Propenoic acid, 3-oxoheptyl ester; 2-Propenoic acid, 5-methoxy-3-oxopentyl ester; 2-Propenoic acid, 2-methyl-, 1-methyl-3-oxobutyl ester; 2-Propenoic acid, 4-methyl-3-oxopentyl ester; Butanoic acid, 3-oxo-, anhydride with 2-propenoic acid; Benzoic acid, 4-ethenyl-, 3-oxobutyl ester; 2-Propenoic acid, 1-methyl-1-(4-methyl-2-oxocyclohexyl)ethyl ester; 10-Undecen-2-one, 1,1,1-trifluoro-; Ethanone, 2,2,2-trifluoro-1-[2-(4-pentenyl) phenyl]-(9CI) and combinations thereof.

Ethylenically unsaturated monomers having no carbonyl functionality that can be used to prepare compound (ii) can include, but are not limited to: (meth)acrylates, such as $C_1$-$C_{20}$ (meth)acrylates; vinyl aromatic monomers; vinyl esters of carboxylic acids; allylic monomers; $C_2$ to $C_{24}$ olefins; and combinations thereof. Non-limiting examples of ethylenically unsaturated radically polymerizable monomers that are free of carbonyl functionality include, but are not limited to: vinyl alcohol; vinyl chloride; acrylonitrile; trimethyl(4-methyl-4-penten-1-yl)-silane; 1-octene; 1-undecene; 1-octadecene; 4-heptenal; 6-methyl-, 9-decen-3-one; 5-methyl 1-heptene; ethenyl cyclopentane; bicyclo[2.2.1]hept-2-ene; ethenyl cyclohexane; 2-propenoic acid, cyclohexyl ester; 2-propenoic acid, bicyclo[2.2.1]hept-2-yl ester; 2-propenoic acid, 4-(1,1-dimethylethyl)cyclohexyl ester; 2-propenoic acid, tricyclo[3.3.1.13,7]dec-2-yl ester; and combinations of two or more thereof.

The $C_1$-$C_{20}$ groups, of the $C_1$-$C_{20}$ (meth)acrylates, can be selected from, for example, $C_1$-$C_{20}$ linear alkyl, $C_3$-$C_{20}$ branched alkyl, $C_3$-$C_{20}$ cycloalkyl, $C_3$-$C_{20}$ fused ring polycycloalkyl, $C_5$-$C_{20}$ aryl, and $C_{10}$-$C_{20}$ fused ring aryl.

Examples of $C_1$-$C_{20}$ (meth)acrylates that are free of carbonyl functionality include, but are not limited to: methyl (meth)acrylate; ethyl (meth)acrylate; propyl (meth)acrylate; isopropyl (meth)acrylate; n-butyl (meth)acrylate; isobutyl (meth)acrylate; tert-butyl (meth)acrylate; 2-ethylhexyl (meth)acrylate; lauryl (meth)acrylate; isobornyl (meth)acrylate; cyclohexyl (meth)acrylate; and 3,3,5-trimethylcyclohexyl (meth)acrylate. Examples of vinyl aromatic monomers that are free of carbonyl functionality, which can be used, include, but are not limited to: styrene; p-chloromethylstyrene; divinyl benzene; vinyl naphthalene; and divinyl naphthalene. Examples of vinyl esters of carboxylic acids that are free of carbonyl functionality include, but are not limited to: vinyl acetate; vinyl butyrate; vinyl 3,4-dimethoxybenzoate; and vinyl benzoate. Examples of allylic monomers that are free of carbonyl functionality include, but are not limited to: allyl chloride; allyl acetate, allyl alcohol, allyl benzyl ether, allyl phenyl ether, 3-allyloxy-1, 2-propanediol, allyl methyl ether.

Hydroxy-functional acrylic polymers may be reacted with a carboxylic acid or ester containing a ketone or aldehyde group, under esterification/transesterification conditions as described above. Hydroxy functional (meth)acrylates are known in the art and may be copolymerized with any of the ethylenically unsaturated (meth)acrylates mentioned above.

Similarly, carboxylic acid functional acrylic polymers may be reacted with a hydroxyl group containing ketone or aldehyde, under esterification/transesterification conditions as described above. Carboxylic acid functional (meth)acrylates are known in the art and may be copolymerized with any of the ethylenically unsaturated (meth)acrylates mentioned above.

In any of the aforementioned curable compositions of the present invention, the component (a) can comprise a mixture of compound (i) having 1 to 4 carbonyl groups per molecule and an equivalent weight of 500 to 30,000 g/mole and compound (ii) having 2 or more carbonyl groups per molecule and an equivalent weight of 130 to 480 g/mole.

The curable composition of the present invention also comprises (b) a polyamine compound having at least two primary amine groups per molecule. The polyamine compound (b) can have a number average molecular weight (Mn) of at least 60 g/mole, such as at least 100 g/mole, or at least 150 g/mole, or at least 200 g/mole, or at least 250 g/mole. Also, the polyamine compound (b) can have a Mn of 100,000 g/mole or less, such as 70,000 g/mole or less, or 50,000 g/mole or less, or 20,000 g/mole or less. The Mn of the polyamine compound (b) can range between any of the recited values inclusive of the recited values.

The polyamine compound (b) can have an equivalent weight based on the sum of primary and secondary amine groups present of at least 30 g/mole, such as 50 g/mole, or 100 g/mole, or 500 g/mole, or 1000 g/mole based on the sum of primary and secondary amine groups present. Also, the polyamine compound (b) can have an equivalent weight based on the sum of primary and secondary amine groups present of 50,000 g/mole or less, such as 35,000 g/mole or less, or 20,000 g/mole or less. The polyamine compound (b) can have a Mn of at least 60 g/mole and an equivalent weight based on the sum of primary and secondary amine groups present of at least 30 g/mole.

The polyamine compound (b) having at least two primary amine groups per molecule can have at least a portion of the primary amine groups protected to prevent premature reaction with either or both of the carbonyl group-containing compounds of component (a) and the polyisocyanate compound (c) (as described herein below). Protection of the primary amine groups can be achieved by methods as are well known in the art. For example, the primary amine groups can be protected via protonation, alkylation, acylation, addition, or coupling.

Examples of polyamines suitable for use in the curable composition of the present invention can include, but are not limited to, Epomin series SP-003, SP-006, SP-012, SP-018, SP-200, P-1050 polyamines commercially available from Nippon Shokubai Co Ltd. (URL http://www.shokubai.co.jp/); Polyment series, NK-350 and NK-380 are solvent type polyamines are also commercially available from Nippon Shokubai Co Ltd. Other polyamines, such as Tris(2-aminoethyl)amine, tetraethylenepentamine, and pentaethylenehexamine, are also commercially available from Sigma-Aldrich.

Some other examples of polyamines can include, but are not limited to, polycarbonate amines, polyester amines, polyether amines, and combinations thereof. Suitable polycarbonate amines and polyester amines that can be used can be synthesized using various methods known in the art. For instance, suitable polycarbonate diamines can be prepared by using a nitrophenyl functionalized initiator for the ring opening of trimethylene carbonate followed by reduction to the amine as described in Macromolecules, 1997, 30, 6074, which is incorporated by reference herein. Further, suitable polyester diamines can be prepared by the condensation of hydroxyl terminated polyesters with N-benzyloxycarbonyl amino acid followed by catalytic hydrogenation to produce the amine as described in Bioconjugate Chemistry, 2002, 13(5), 1159-1162, which is incorporated by reference herein. Non-limiting examples of polyether amines include those diamines and triamines commercially available from Huntsman under the trade name JEFFAMINE®.

The mole ratio of total combined primary and secondary amine group equivalents of the polyamine compound (b) to total carbonyl group equivalents of the carbonyl group-containing compounds of component (a) is at least 1:2, such as at least 1:1, or at least 2:1, or at least 3:1, or at least 6:1.

The curable composition of the present invention also comprises (c) a polyisocyanate compound having at least two isocyanate groups per molecule, and an isocyanate equivalent weight of less than or equal to 500 g/mole, such as less than or equal to 450 g/mole, or less than or equal to 400 g/mole, or less than or equal to 380 g/mole. Also, the polyisocyanate compound (c) having at least two isocyanate groups per molecule can have an isocyanate equivalent weight of greater than or equal to 80 g/mole, such as greater than or equal to 110 g/mole, or greater than or equal to 150 g/mole, or greater than or equal to 160 g/mole. The equivalent weight of the polyisocyanate compound can range between any of the recited values inclusive of the recited values.

The polyisocyanate compound (c) includes at least two isocyanate groups (—NCO). Examples of suitable polyisocyanates can include, but are not limited to, toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; lysine methyl ester diisocyanate; bis(isocyanato ethyl)fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; norbornane diisocyanate; and mixtures thereof.

Further, the polyisocyanate compound (c) can be selected from polyisocyanates prepared from dimers and trimers of diisocyanate monomers. Dimers and trimers of diisocyanate monomers can be prepared by art-recognized methods, such as described in U.S. Pat. No. 5,777,061 at column 3, line 44 through column 4, line 40. Dimers and trimers of the above recited diisocyanate monomers can contain linkages selected from the group consisting of isocyanurate, uretdione, biuret, allophanate and combinations thereof.

The polyisocyanate compound (c) also can be selected from an oligomeric polyisocyanate functional adduct. The oligomeric polyisocyanate functional adduct can contain structural linkages selected from urethane (—NH—C(O)—O—), thiourethane (—NH—C(O)—S—), urea (—N(R')—C(O)—N(R')—, where each $R^1$ is independently selected from hydrogen and any suitable organic group, such as a linear or branched $C_1$-$C_{20}$ alkyl group, cycloalkyl group, aryl group, and combinations thereof.

As used herein, by "oligomeric polyisocyanate functional adduct" is meant a material that is substantially free of polymeric chain extension. Oligomeric polyisocyanate functional adducts can be prepared by art-recognized methods, for example, from a compound containing three or more active hydrogen groups, such as trimethylolpropane (TMP), and an isocyanate monomer, such as 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared ("TMP-3IPDI").

The active hydrogen group containing compound, used to prepare the oligomeric polyisocyanate functional adduct, can be aliphatic, such as TMP, trishydroxyisocyanurate, pentaerythritol, and trimethylolpropane tris(mercaptoacetate). The isocyanate monomer, used to prepare the oligomeric polyisocyanate functional adduct, can be a diisocyanate monomer, such as any of those described previously herein.

The isocyanate groups of the polyisocyanate compound (c) can be blocked with a blocking agent. After exposure to elevated temperature, the blocking agent separates from the isocyanate functional material, allowing the free/unblocked isocyanate groups thereof to react and form covalent bonds with the active hydrogen groups of polyamine compound (b) and/or with isocyanate groups of itself (to form biurets or isocyanurates). After unblocking from the polyisocyanate, the blocking agent can volatile out of the composition (prior to the composition becoming cured) and/or remain in the composition, such as a plasticizer. It is desirable that the blocking agent not form bubbles in the composition and/or overly plasticize the composition after deblocking.

The blocking groups of the blocked polyisocyanate compound can be selected from hydroxy functional compounds, 1H-azoles, lactams, ketoximes, and mixtures thereof. Classes of hydroxy functional compounds can include, but are not limited to, aliphatic, cycloaliphatic, or aromatic alkyl monoalcohols or phenolics. Specific examples of hydroxy functional compounds useful as blocking agents include, but are not limited to, lower aliphatic alcohols such as methanol, ethanol, and n-butanol; cycloaliphatic alcohols such as cyclohexanol and tetrahydrofuran; aromatic-alkyl alcohols, such as phenyl carbinol and methylphenyl carbinol; and glycol ethers, e.g., ethylene glycol butyl ether, diethylene glycol butyl ether, ethylene glycol methyl ether and propylene glycol methyl ether. The hydroxy functional blocking groups can include phenolics, examples of which include, but are not limited to, phenol itself and substituted phenols, such as cresol, nitrophenol and p-hydroxy methylbenzoate.

Examples of 1H-azoles that are useful as blocking groups can include, but are not limited to, 1H-imidazole, 1H-pyrazole, 1H-dialkyl pyrazoles (such as 1H-3,5-dimethyl pyrazole and 1H-2,5-dimethyl pyrazole), 1H-1,2,3-triazole, 1H-1,2,3-benzotriazole, 1H-1,2,4-triazole, 1H-5-methyl-1,2,4-triazole, and 1H-3-amino-1,2,4-triazole.

Ketoximes useful as blocking groups can include those prepared from aliphatic or cycloaliphatic ketones. Examples of ketoxime blocking groups include, but are limited to, 2-propanone oxime (acetone oxime), 2-butanone oxime (also referred to as methylethyl ketoxime), 2-pentanone oxime, 3-pentanone oxime, 3-methyl-2-butanone oxime, 4-methyl-2-pentanone oxime, 3,3-dimethyl-2-butanone oxime, 2-heptanone oxime, 3-heptanone oxime, 4-heptanone oxime, 5-methyl-3-heptanone oxime, 2,6-dimethyl-4-heptanone oxime, cyclopentanone oxime, cyclohexanone oxime, 3-methylcyclohexanone oxime, 3,3,5-trimethylcyclohexanone oxime, and 3,5,5-trimethyl-2-cyclohexene-5-one oxime.

Examples of lactam blocking groups can include, but are not limited to, e-caprolactam and 2-pyrolidinone. Other suitable blocking groups include morpholine, 3-aminopropyl morpholine, and N-hydroxy phthalimide.

In the curable compositions of the present invention, at least some of the reactive functional groups of the polyisocyanate compound (c) can be blocked with a blocking agent, and each blocking agent is independently selected from the group consisting of methylethyl ketoxime, pyrazole (more particularly, 1H-pyrazole; 3,5-dimethyl pyrazole), and dialkyl pyrazole (more particularly, 1H-dialkyl pyrazole).

The blocked polyisocyanates can also include those commercially available from Baxenden under the trade name TRIXENE®, such as TRIXENE® BI 7950, TRIXENE® BI 7951, TRIXENE® BI 7960, TRIXENE® BI 7961, TRIXENE® BI 7963, and TRIXENE® BI 7982. Other commercially available blocked polyisocyanates include those commercially available from Bayer under the trade name DESMODUR®, such as DESMODUR® BL 3175A, DESMODUR® BL 3272, DESMODUR® BL 3370, DESMODUR® BL 3475, and DESMODUR® BL 4265 SN.

The mole ratio of isocyanate equivalents from polyisocyanate compound (c) to total combined primary and secondary amine group equivalents of polyamine compound (b) is at least 1:1, such as at least 3:1, or at least 6:1.

Each of the component comprising one or more carbonyl group-containing compounds (a) as described above, the polyamine compound (b) having at least two primary groups as described above, and the polyisocyanate compound (c) as described above can be added as separate components to form the curable composition of the present invention. Alternatively, the component (a) comprising one or more carbonyl group-containing compounds and the polyamine compound (b) having at least two primary groups can be pre-reacted to form a poly(imine) pre-polymer prior to addition of the polyisocyanate compound (c) to form the curable composition of the present invention. The resulting poly(imine) pre-polymer will depend upon relative amounts of the component (a) comprising one or more carbonyl group-containing compounds and the polyamine compound (b) used, as well as reaction conditions such as time and temperature described herein below.

Any of the aforementioned curable compositions can further comprise a photochromic compound. The photochromic compound can be selected from known classes and examples of photochromic compounds, and can include combinations or mixtures thereof.

For example, although not limiting herein, mixtures of photochromic compounds can be used to attain certain activated colors, such as a near neutral gray or near neutral brown. See, for example, U.S. Pat. No. 5,645,767, column 12, line 66 to column 13, line 19, which describes the parameters that define neutral gray and brown colors and which disclosure is specifically incorporated by reference herein.

The photochromic compound suitable for use in the curable compositions of the present invention can be selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, diarylethenes, and mixtures of such photochromic compounds. Further examples of other photochromic compounds that can be used in the curable compositions of the present invention can include, but are not limited to, those disclosed at column 34, line 20 through column 35, line 13 of U.S. Pat. No. 9,028,728 B2, which disclosure is specifically incorporated by reference herein.

The photochromic compound generally is present in the curable photochromic composition of the present invention in an amount at least sufficient so as to provide an article prepared from the composition with a desirable level of photochromic properties, which is referred to as a photochromic amount. The amount of photochromic compound(s) present in the curable composition can range from 0.001 percent by weight to 40 percent by weight, or from 0.001 to 10 percent by weight, or from 0.1 to 10 percent by weight, or from 1 to 6 percent by weight, based on the total solids weight of curable composition (including the weight of the photochromic compound(s), and inclusive of the recited values).

The curable compositions of the present invention optionally can contain additives such as, but not limited to, waxes for flow and wetting; plasticizers, thermoplastics, flow control agents, such as poly(2-ethylhexyl)acrylate; antioxidants; hindered amine light stabilizers, ultraviolet (UV) light absorbers, ultraviolet light stabilizers, surfactants, adhesion promoters, fixed-tint dyes, and solvents. Examples of useful antioxidants include, but are not limited to, those available commercially from BASF under the trademarks IRGANOX and TINUVIN. These optional additives, when used, can be present in amounts up to 30 percent by weight, based on total solids weight of the curable composition (excluding solvent).

Commercially available plasticizer additives include, but are not limited to, benzoflex 9-88, benzoflex 9-88 SG, enhancer 400, admex 6995, admex 6187, admex 760, and admex 770 are commercially available from Eastman Chemical company; the polybutadiene based plasticizers are polyvest 130, polyvest MA75, polyvest HT, polyvest EP ST M, and polyvest EP ST E-100 are available from Evonik; the polymeric plasticizers D-1116, G-1701 MU, G-1643, G-1652 MU, G-1657 MS, G-1657 VS, G-1701 MU, and MD-1648 are available from Kraton Corporation.

Commercially available thermoplastic polyurethanes (TPUs) additives are similar to those hydroxyl functional thermoplastic polyurethane copolymers, as previously described herein.

As mentioned above, the curable compositions of the present invention can further include one or more fixed-tint dyes. As used herein, the term "fixed-tint dye" and related terms, such as "fixed-colorant", "static colorant", "fixed dye", and "static dye" means dyes that are non-photosensitive materials, which do not physically or chemically respond to electromagnetic radiation with regard to the visually observed color thereof. The term "fixed-tint dye" and related terms as used herein does not include and is distinguishable from a photochromic compound. As used herein, the term "non-photosensitive materials" means materials that do not physically or chemically respond to electromagnetic radiation with regard to the visually observed color thereof, including, but not limited to, fixed-tint dyes.

One or more fixed-tint dyes can be present in the curable compositions of the present invention for purposes including, but not limited to, providing a cured article prepared from the curable compositions with at least a base (or first) color characteristic of the fixed-tint dye, when the photochromic compound (if used) is not activated; and optionally a second color characteristic of the combination of the fixed-tint dye and the photochromic compound when activated, such as by exposed to actinic radiation. The optional fixed-tint dye of the curable photochromic composition can comprise at least one of azo dyes, anthraquinone dyes, xanthene dyes, azime dyes, iodine, iodide salts, polyazo dyes, stilbene dyes, pyrazolone dyes, triphenylmethane dyes, quinoline dyes, oxazine dyes, thiazine dyes, and polyene dyes.

The curable compositions of the present invention can include solvents such as those selected from water, organic solvents, and combinations thereof.

Classes of organic solvents that can be present in the curable photochromic compositions of the present invention include, but are not limited to, ethers, such as dimethyl ether and methyl ethyl ether; cyclic ethers, such as tetrahydrofuran and dioxane; esters, such as ethyl acetate, 2-butoxyethylacetate, ethyl lactate, ethylene carbonate and propylene carbonate, in particular 1,2-propanediol cyclic carbonate; alkylene glycol ethers, such as dialkyl ether of ethylene glycol and dialkylether of propylene glycol; nitrogen containing cyclic compounds, such as pyrrolidone, 1-methyl-2-pyrrolidinone, 1-butylpyrrolidin-2-one and 1,3-dimethyl-2-imidazolidinone; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes, or Aromatic 150, which is a commercially available mixture of $C_9$-$C_{11}$ alkyl benzenes.

Solvent(s) can be present in the curable compositions of the present invention, in an amount of from 5 to 95 percent by weight, or from 15 to 80 percent by weight, or from 20 to 60 percent by weight, in each case based on the total weight of the curable composition (including the weight of the solvent).

The curable composition of the present invention can be cured by any suitable methods. The curable composition can be cured at ambient conditions, such as at room temperature of about 25° C. Alternatively, the curable photochromic composition can be cured by exposure to elevated temperature (in excess of ambient room temperature). As used herein, by "cured" is meant a three-dimensional crosslink network is formed by covalent bond formation. When cured at elevated temperature, the curable composition can be referred to herein as a thermosetting curable composition. Times and temperatures for curing the thermosetting curable composition of the present invention can vary. For example, the curable composition of the present invention can be cured at an elevated temperature of from 50° C. to 204° C., or from 80° C. to 177° C., or from 90° C. to 140° C., for a period of 20 to 240 minutes.

Any of the curable compositions described herein can comprise a curable coating composition or a curable adhesive composition. Further, either or both of the curable coating composition and the curable adhesive composition can include one or more photochromic compounds, such as any of those photochromic compounds described above.

It has been noted that photochromic coatings formed from curable compositions comprising only the carbonyl group-containing compounds and polyamine compounds (with no polyisocyanate) result in a poly(imine) coating matrix which is soft, and exhibits a yellow color and a slow photochromic fade rate. By comparison, the curable compositions of the present invention which include (a) a component comprising one or more carbonyl group-containing compounds, (b) a polyamine compound, and (c) a polyisocyanate compound are believed to result in a phase-separated poly(urea)-poly(imine) matrix having a plurality of softer (i.e., poly(imine)) domains within the cured composition having a Tg ranging from −100° C. to 0° C., and a plurality of harder (i.e., poly(urea)) domains having a Tg ranging from 5° C. to 120° C., within the cured composition. Without being bound by any theory, it is believed that at least a portion of the photochromic compound(s) reside within the softer poly(imine) domains of the cured coating. Thus, when applied to a substrate and cured, the compositions of the present invention provide improved photochromic fade rate, acceptable hardness and improved color.

The present invention also relates to a coated article, such as a coated optical article, that comprises a substrate; and a cured coating layer over at least a portion of the substrate, wherein the cured coating layer is formed from any of the aforementioned curable compositions of the present invention.

The article, that includes a substrate and a cured coating layer over at least a portion of the substrate (formed from any of the previously described curable compositions of the present invention), can be selected from ophthalmic articles, e.g., lenses, display articles, windows, and mirrors. Correspondingly, the substrate of the article can be selected from ophthalmic substrates, displays, windows, and mirrors. The substrate can be comprised of one or more suitable materials, including, but not limited to, organic materials, such as organic polymeric materials; glasses, such as silica-based glasses; metals; ceramic materials; and combinations thereof.

Non-limiting examples of organic materials that can be used to form the substrate of the articles of the present invention include polymeric materials, for example, homopolymers and copolymers, prepared from the monomers and mixtures of monomers disclosed in U.S. Pat. No. 5,962,617 and in U.S. Pat. No. 5,658,501 from column 15, line 28 to column 16, line 17, the disclosures of which U.S. patents are specifically incorporated herein by reference. For example, such polymeric materials can be thermoplastic or thermoset polymeric materials, can be transparent or optically clear, and can have any refractive index required. Non-limiting examples of such disclosed monomers and polymers include polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly (ethylene glycol) bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXI-GLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The substrate optionally can include a photochromic material and/or a fixed-tint dye, which can each be selected from those classes and examples of photochromic materials and fixed-tint dyes as described previously herein. The optional photochromic material(s)/compound(s) present in the substrate can be the same or different than the photochromic compound(s) which can be used in the cured coating layer. The optional fixed-tint dye(s) can be the same or different than the optional fixed-tint dye(s) of the cured coating layer.

The cured coating layer of the article can be a coating layer formed from any of the previously described curable compositions of the present invention. The curable composition can be applied to the substrate in accordance with art-recognized methods, which include, but are not limited to, spray application methods, curtain coating application methods, draw-down blade (or bar) application methods, dip-coating application methods, spin-coating application methods, jet printing methods (such as inkjet printing methods, where the "ink" is replaced with a curable photochromic composition according to the present invention), and combinations thereof.

After application of the curable composition over at least one surface of the substrate, the applied curable composition is cured, such as described previously herein to form a cured coating layer. The coating layer can be in the form of a single layer or multiple layers. When in the form of multiple layers, each layer can be prepared from curable compositions according to the present invention, having the same or different compositions, such as the same or different photochromic compound(s).

The cured layer can have any suitable thickness, such as from 2 micrometers to 250 micrometers, or from 10 micrometers to 100 micrometers.

In addition to the cured coating layer, the article optionally can include one or more further art-recognized layers, such as, but not limited to, a primer layer(s); an adhesive layer(s); a protective layer(s) (such as a hard-coat layer); a polarizing layer(s); a birefringent layer(s); an antireflective layer(s); and/or photochromic layer(s) that is prepared from a composition other than the curable composition of the present invention.

The disclosure also may be characterized by one or more of the following aspects:

In a first aspect, the curable composition of the present invention may comprise: (a) a component comprising one or more carbonyl group-containing compounds having a number average molecular weight (Mn) of at least 500 g/mole, wherein each carbonyl group is independently a ketone group or an aldehyde group; (b) a polyamine compound having at least two primary amine groups per molecule; and (c) a polyisocyanate compound.

In a second aspect, component (a) of the first aspect can comprise: (i) a compound having 1 to 4 carbonyl groups per molecule and an equivalent weight of 500 to 30,000 g/mole; or (ii) a compound having 2 or more carbonyl groups per molecule and an equivalent weight of 130 to 480 g/mole; or (iii) a mixture of (i) and (ii).

In a third aspect, the compound (i) of the second aspect can be selected from the group consisting of carbonyl group-containing polycarbonates, carbonyl group-containing polyethers, carbonyl group-containing polyesters, carbonyl group-containing polyurethanes, copolymers thereof, and mixtures thereof.

In a fourth aspect, the polyamine compound (b) in accordance with any one of the first to third aspects can have a number average molecular weight of at least 60 g/mole and an equivalent weight based on the sum of primary and secondary amine groups present of at least 30 g/mole.

In a fifth aspect, the at least two primary amine groups per molecule of the polyamine compound (b) in accordance with any one of the first to fourth aspects can have at least a partially protected amino group.

In a sixth aspect, the polyisocyanate compound (c) in accordance with any one of the first to fifth aspects can have at least two isocyanate groups per molecule and an equivalent weight of less than or equal to 500 g/mole.

In a seventh aspect, the curable composition in accordance with any one of the first to sixth aspects can further comprise a photochromic compound.

In an eighth aspect, the photochromic compound of the seventh aspect can be selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, diarylethenes, and mixtures thereof.

In a ninth aspect, the curable composition in accordance with any one of the first to eighth aspects can have a mole ratio of total combined primary and secondary amine group equivalents of the polyamine compound (b) to total carbonyl group equivalents of the component (a) of at least 1:1.

In a tenth aspect, the curable composition in accordance with any one of the first to ninth aspects can have a mole ratio of isocyanate equivalents of the polyisocyanate compound (c) to total combined primary and secondary amine group equivalents of the polyamine compound (b) of at least 1:1.

In an eleventh aspect, the curable composition in accordance with any one of the first to tenth aspects can be a curable coating composition or a curable adhesive composition.

In a twelfth aspect, the curable composition in accordance with any one of the first to eleventh aspects can further comprise a material selected from the group consisting of antioxidants, hindered amine light stabilizers, ultraviolet light stabilizers, plasticizers, thermoplastics, flow control agents, surfactants, adhesion promoters, solvents, fixed-tint dyes, and mixtures thereof.

In a thirteenth aspect, the curable composition in accordance with any one of the first to twelfth aspects, when applied to a substrate and cured, can form a phase-separated layer having a plurality of soft domains having a Tg ranging from −100° C. to 0° C., and a plurality of hard domains having a Tg ranging from 5° C. to 120° C.

In a fourteenth aspect, the curable composition of the thirteenth aspect can include a photochromic compound which resides within the soft domains of the phase-separated layer.

In a fifteenth aspect, the curable composition of any one of the first to fourteenth aspects can include the component (a) comprising one or more carbonyl group-containing compounds and the polyamine compound (b) having at least two primary groups pre-reacted to form a poly(imine) prepolymer prior to addition of the polyisocyanate compound (c) to form the curable composition.

In a sixteenth aspect, a coated article is provided comprising a substrate and a cured coating layer over at least a portion of the substrate, wherein the cured coating layer is formed from the curable coating composition of any one of the first to fifteenth aspects, such as the eleventh aspect.

In a seventeenth aspect, the coated article in accordance with the sixteenth aspect comprises a curable coating composition comprising a photochromic compound.

In an eighteenth aspect, the coated article in accordance with the sixteenth or seventeenth aspect can have a cured coating layer having a Fischer micro-hardness of at least 25 N/mm².

In a nineteenth aspect, the coated article in accordance with any one of the sixteenth to eighteenth aspects can be an optical article, a display element, a mirror, or a window.

In a twentieth aspect, the optical article of the nineteenth aspect can be a lens, such as an ophthalmic lens.

Illustrating the invention are the following examples which, however, are not to be considered as limiting the invention to their details.

EXAMPLES

Part 1. Preparation of Formulation Components

Example 1

Example 1 describes the preparation of polycarbonate diketone as follows.

A polycarbonate diol with a reported molecular weight of 1000 g/mole and an average hydroxyl equivalent weight of 500 g/mole, available from UBE Industries, Ltd. as ETERNACOLL® PH100D ("PH-100D", 100 g), levulinic acid (29 g), N,N-dicyclohexylcarbodiimide ("DCC", 51 g), N,N-dimethylaminopyridine ("DMAP", 6.1 g), and dichloromethane ("DCM", 250 ml) were combined and stirred overnight under nitrogen. The precipitated N,N-dicyclohexylurea ("DCU") was removed by filtration, and the remaining solution was washed with HCl (1N, 250 ml×2), saturated aqueous NaHCO₃ solution (250 ml×2), and brine (250 ml×2). The organic phase was then dried over MgSO₄ and filtered through celite. The solvent was removed to give 95 g of pale yellow liquid, to which 100 ml of methanol was added. After allowing the layers to separate, the methanol layer was decanted off and the product dried under vacuum to yield 70 g colorless liquid. A ketone equivalent weight of 1094 g/mole was calculated by NMR.

Example 2

Example 2 describes the preparation of a polycarbonate diketone as follows.

To a 250 ml 4 neck round bottomed flask with a dean-stark trap were added a polycarbonate diol with a reported molecular weight of 2000 g/mole and an average hydroxyl equivalent weight of 1000 g/mole, available from UBE Industries, Ltd. as ETERNACOLL® PH200D ("PH200D", 100 g), levulinic acid (11.6 g), p-toluenesulfonic acid ("p-TSA", 0.22 g) and triphenylphosphite ("TPP", 0.56 g) in xylene (50 ml) under nitrogen. The reaction mixture was heated to 140° C. for 3 hours, removing collected water. The temperature was then increased to 160° C. for 1.5 hours, then held 1 hour at 165° C., followed by 0.5 hour at 170° C., removing accumulated water and xylene throughout. The residue was then dried under vacuum to yield 110 g of product. A ketone equivalent weight of 1076 g/mole was calculated by NMR.

Example 3

Example 3 describes the preparation of a polycarbonate diacetophenone as follows.

A polycarbonate diacetophenone was prepared in accordance with procedures of Example 1, using the following reagents: Polycarbonate diol ("PH-200D", 50 g), 4-acetylbenzoic acid (8.6 g), DCC (10.8 g), DMAP (0.3 g) and DCM (300 ml). Yield: 58 g. A molecular weight of 2500 g/mole and ketone equivalent weight of 1250 g/mole were calculated by NMR. Prior to use, the material was diluted to 80% solids with 1-Methyl-2-Pyrrolidone.

Example 4

Example 4 describes the preparation of polycarbonate dialdehyde as follows.

Example 4 was prepared in accordance with procedures of Example 1, substituting an equimolar amount of 4-formylbenzoic acid in place of levulinic acid, to yield 66 g of the dialdehyde. The calculated molecular weight from NMR was 1536 g/mole, and the aldehyde equivalent weight was 768 g/mole.

Example 5

Example 5 describes the preparation of thermoplastic polyurethane diketone ("TPU diketone") as follows.

A diketone was synthesized in accordance with the procedures of Example 1, using the following reagents: CARBOTHANE™ PC-3575A, 50 g (a thermoplastic polyurethane diol available from The Lubrizol Corporation, with a measured molecular weight (Mn) of 39,460 g/mole by GPC with THF eluent), levulinic acid (1.0 g), DCC (1.6 g), DMAP (1.0 g) and DCM (500 ml). Yield: 50 g. Ketone equivalent weight is 19828 g/mole, calculated based on molecular weight.

Example 6

Example 6 describes the preparation of polycaprolactone mono-acetoacetate as follows.

Step-1:

To a solution of 1-octanol (10 g) and caprolactone (131.4 g) in DCM (100 ml) was added diphenyl phosphate (3.85 g) under nitrogen. The solution was stirred at room temperature for 8 hours. The resultant organic solution was washed with saturated aqueous $NaHCO_3$ solution (250 ml×2) and brine (250 ml×2), followed by a short silica gel plug. The solvent was removed, and the crude product dried under vacuum. Yield 140 g. The product was used for the next step without further purification.

Step-2:

The product of step-1 (140 g) and t-butyl acetoacetate (12.3 g) were dissolved in toluene (500 ml), and heated at reflux overnight. Volatiles were removed by distillation, then the residue was dried under vacuum to give 150 g of a white solid, which was used directly without further purification. A ketone equivalent weight of 1926 g/mole was calculated from NMR.

Example 7

Example 7 describes the preparation of polycarbonate diacetoacetate as follows.

PH-200D (100 g) and t-butyl acetoacetate (16.2 g) were dissolved in toluene (300 ml), and heated at reflux overnight. Volatiles were removed by distillation. The residue was then dried under vacuum (50° C. for 6 hours) to give 115 g of a colorless oil. A ketone equivalent weight of 1008 g/mole was calculated by NMR.

Example 8

Example 8 describes the preparation of a polyurethane polycarbonate polyketone ("PU—PC polyketone") as follows.

Step-1:

DESMODUR® N 3200 (2 g) (an aliphatic polyisocyanate available from Covestro) was added dropwise over 1 hour to a solution of a polycarbonate diol with a reported average molecular weight of 3000 g/mole, available from UBE Industries, Ltd. as ETERNACOLL® PH-300D ("PH-300D," 33 g) in anhydrous toluene (200 ml) at 75° C. using dibutyltin dilaurate (20 mg) catalyst. The resultant reaction mixture was stirred for about 6 hours under nitrogen, until isocyanate was consumed. The solvent was removed to give 35 g of crude product, which was directly used in step-2.

Step-2:

The product from step-1 (25 g), levulinic acid (2.75 g), DCC (4.88 g), DMAP (0.5 g) and DCM (250 ml) were combined and subjected to the same reaction and isolation conditions as in Example 1. Yield: 24 g. A molecular weight of 10,500 g/mole and a ketone equivalent weight of 3500 g/mole were calculated by NMR.

Example 9

Example 9 describes the preparation of pentaerythritol tetraketone as follows.

Pentaerythritol (10 g), levulinic acid (35 g), DCC (63.5 g), DMAP (1.8 g) and DCM (200 ml) were subjected to the same reaction and isolation conditions of Example 1. Yield: 35 g. A ketone equivalent weight of 132 g/mole was calculated by NMR.

Example 10

Example 10 describes the preparation of an acrylic polyketone as follows.

Di(propylene glycol) methyl ether acetate ("DMPA", 60 ml) was sparged with $N_2$ for 15 minutes followed by heating to 130° C. To this was added a solution of diacetone acrylamide (89.2 g, dissolved in 150 ml of DMPA), n-butyl methacrylate (75 g), 2,2'-azobis(2-methylbutyronitrile) (9.75 g), TPP (0.82 g), tert-dodecanethiol (1.65 g), dropwise over 60 minutes. After stirring for 30 minutes at 130° C., 2,2'-azobis(2-methylbutyronitrile) (0.5 g) in DPMA (5 ml) was added, the solution was stirred for an additional hour, cooled to 100° C., then slowly added to cold hexanes (5° C., 1.25 L) with stirring. The solution was then cooled to room temperature, after which the top layer was decanted off and the remaining viscous liquid was dried under vacuum at 50° C. for about two hours to give 175 g of product with a weight average molecular weight (Mw) of 6060 g/mole and number average molecular weight (Mn) of 3980 g/mole as determined by GPC with THF eluent against polystyrene standards. A ketone equivalent weight of 288 g/mole was calculated based on NMR.

Part 2. Preparation of Curable Compositions

Examples 11-16

Coating compositions Examples 11-13 and the Comparative Examples (CE) 14-16 were prepared using the components listed in Table 1 below, shown in parts by weight. The components of charge 1 were mixed for about 30 minutes. The charge 2 components were added at room temperature, followed by stirring for 1 hour. The charge 3 components were added and the mixtures were stirred for an additional 15 minutes prior to use.

TABLE 1

| | Ex. 11 | Ex. 12 | Ex. 13 | CE. 14 | CE. 15 | CE. 16 |
|---|---|---|---|---|---|---|
| Charge 1 | | | | | | |
| BYK ® 333[i] | 0.08 | 0.08 | 0.08 | 0.08 | 0.08 | 0.08 |
| 1-Methyl-2-pyrrolidinone | 35.44 | 35.44 | 35.44 | 35.44 | 35.44 | 35.44 |
| Charge 2 | | | | | | |
| Acrylic polyketone of Example 10 | 7.1 | — | 7.1 | 7.1 | — | 7.12 |
| Diacetophenone of Example 3 | — | 28.1 | 28.1 | 28.1 | — | 28.12 |
| TRIXENE ® BI-7960[ii] | 97.1 | 97.1 | 97.1 | — | 97 | 97 |

TABLE 1-continued

|  | Ex. 11 | Ex. 12 | Ex. 13 | CE. 14 | CE. 15 | CE. 16 |
|---|---|---|---|---|---|---|
| Charge 3 |  |  |  |  |  |  |
| EPOMIN™ SP-006[iii] | 3.9 | 3.9 | 3.9 | 3.9 | 3.9 | — |
| Dibutyltin dilaurate | 0.33 | 0.33 | 0.33 | 0.33 | 0.33 | 0.33 |
| % NV solids (theoretical) | 60.8 | 61.1 | 61.5 | 61.5 | 61.5 | 61.5 |
| Mole ratio 1 (amine:CO) | 4:1 | 4:1 | 2:1 | 2:1 | 2:0 | 0:1 |
| Mole ratio 2 (NCO:amine) | 3:1 | 3:1 | 3:1 | 0:1 | 3:1 | 3:0 |

[i]A polyether modified dimethylpolysiloxane copolymer, available from BYK-Chemie.
[ii]A blocked hexamethylene diisocyanate biuret available from Baxenden Chemical Co. with an isocyanate equivalent weight (on solids) of 287 g/mole, provided at 70% solids in propylene glycol monomethyl ether.
[iii]Available from Nippon Shokubai Co LTD, with a reported molecular weight of 600 g/mole and amine (primary and secondary) equivalent weight of 50 g/mole.

Examples 17-33

Photochromic compositions were prepared using the components listed in each of the tables below, shown in parts by weight. For each photochromic composition, the components of Charge 1 were combined and heated to 50° C. for a minimum of 30 minutes until the solids dissolved completely. Each of the solutions was cooled to room temperature and the charge 2 components were added to each solution, followed by stirring for 1 hour. The charge 3 components were added and the mixtures were stirred for an additional 15 minutes prior to use.

The following Table 2 describes compositions with high equivalent weight dicarbonyl, with and without low equivalent weight polycarbonyl.

TABLE 2

|  | Ex. 17 | Ex. 18 |
|---|---|---|
| Charge 1 |  |  |
| Photochromic dyes[iv] | 6.00 | 6.00 |
| TINUVIN ® 144[v] | 2.00 | 2.00 |
| IRGANOX ® 245[vi] | 2.00 | 2.00 |
| (3-Glycidoxypropyl) trimethoxysilane | 4.50 | 4.50 |
| BYK ® 333 | 0.08 | 0.08 |
| 1-Methyl-2-pyrrolidinone | 35.44 | 35.44 |
| Charge 2 |  |  |
| Acrylic polyketone of Example 10 | — | 7.1 |
| Diacetophenone of Example 3 | 28.1 | 28.1 |
| TRIXENE ® BI-7960 | 97.1 | 97.1 |
| Charge 3 |  |  |
| EPOMIN™ SP-006 | 3.9 | 3.9 |
| Dibutyltin dilaurate | 0.33 | 0.33 |
| % NV solids (theoretical) | 60.8 | 61.5 |
| Mole ratio 1 (amine:CO) | 4:1 | 2:1 |
| Mole ratio 2 (NCO:amine) | 3:1 | 3:1 |

[iv]blend of photochromic indenofused naphthopyran dyes formulated to give a grey color on activation.
[v]A hindered amine light stabilizer, commercially available from BASF.
[vi]An antioxidant commercially available from BASF.

The following Table 3 describes compositions with varying ratios of high equivalent weight ("soft") and low equivalent weight ("hard") carbonyl components.

TABLE 3

|  | Ex. 19 | Ex. 20 |
|---|---|---|
| Charge 1 |  |  |
| Photochromic dyes | 6.01 | 6.01 |
| TINUVIN ® 144 | 2.00 | 2.00 |
| IRGANOX ® 245 | 2.00 | 2.00 |
| (3-Glycidoxypropyl) trimethoxysilane | 4.50 | 4.50 |
| BYK ® 333 | 0.08 | 0.08 |
| 1-Methyl-2-pyrrolidinone | 59.97 | 59.97 |
| Charge 2 |  |  |
| Acrylic polyketone of Example 10 | 11.25 | 21.25 |
| Diketone of Example 1 | 34.2 | 16.1 |
| Trixene BI-7960 | 76.7 | 90.28 |
| Charge 3 |  |  |
| Epomin SP-006 | 3.1 | 3.7 |
| Dibutyltin dilaurate | 0.3 | 0.3 |
| % NV solids (theoretical) | 58 | 58 |
| Mole ratio 1 (amine:CO) | 1:1 | 1:1 |
| Mole ratio 2 (NCO:amine) | 3:1 | 3:1 |
| Mole ratio 3 [CO (i):CO (ii)] | 1:1 | 1:4 |

The following Table 4 describes photochromic compositions employing different ratios of amine to carbonyl components.

TABLE 4

|  | Ex. 21 | Ex. 22 |
|---|---|---|
| Charge 1 |  |  |
| Photochromic dyes | 6.01 | 6.01 |
| TINUVIN ® 144 | 2.00 | 2.00 |
| IRGANOX ® 245 | 2.00 | 2.00 |
| (3-Glycidoxypropyl) trimethoxysilane | 4.50 | 4.50 |
| BYK ® 333 | 0.08 | 0.08 |
| 1-Methyl-2-pyrrolidinone | 44.61 | 38.06 |
| Charge 2 |  |  |
| Acrylic polyketone of Example 10 | 11.12 | 7.12 |
| Diacetophenone of Example 3 | 43.87 | 27.75 |
| Trixene BI-7960 | 75.57 | 97.43 |
| Charge 3 |  |  |
| Epomin SP-006 | 3.1 | 3.9 |
| Dibutyltin dilaurate | 0.3 | 0.3 |
| % NV solids (theoretical) | 63 | 63 |
| Mole ratio 1 (amine:CO) | 1:1 | 2:1 |
| Mole ratio 2 (NCO:amine) | 3:1 | 3:1 |

The following Table 5 describes preparation of photochromic compositions using different ratios of isocyanate to amine components.

TABLE 5

|  | Ex. 23 | Ex. 24 |
|---|---|---|
| Charge 1 |  |  |
| Photochromic dyes | 6.01 | 6.01 |
| TINUVIN ® 144 | 2.00 | 2.00 |
| IRGANOX ® 245 | 2.00 | 2.00 |
| (3-Glycidoxypropyl) trimethoxysilane | 4.50 | 4.50 |
| BYK ® 333 | 0.08 | 0.08 |
| 1-Methyl-2-pyrrolidinone | 57.15 | 50.80 |

TABLE 5-continued

|  | Ex. 23 | Ex. 24 |
|---|---|---|
| Charge 2 |  |  |
| Acrylic polyketone of Example 10 | 19.87 | 12.62 |
| Diketone of Example 2 | 20.4 | 12.7 |
| Trixene BI-7960 | 86.0 | 107.14 |
| Charge 3 |  |  |
| Epomin SP-006 | 3.5 | 2.2 |
| Dibutyltin dilaurate | 0.3 | 0.3 |
| % NV solids (theoretical) | 58 | 58 |
| Mole ratio 1 (amine:CO) | 1:1 | 1:1 |
| Mole ratio 2 (NCO:amine) | 3:1 | 6:1 |

The following Table 6 describes the preparation of photochromic compositions employing varying molecular weight amines.

TABLE 6

|  | Ex. 25 | Ex. 26 | Ex. 27 |
|---|---|---|---|
| Charge 1 |  |  |  |
| Photochromic dyes | 6.01 | 6.01 | 5.99 |
| TINUVIN ® 144 | 2.00 | 2.00 | 1.99 |
| IRGANOX ® 245 | 2.00 | 2.00 | 1.99 |
| (3-Glycidoxypropyl) trimethoxysilane | 4.50 | 4.50 | 4.50 |
| BYK ® 333 | 0.08 | 0.08 | 0.08 |
| 1-Methyl-2-pyrrolidinone | 57.08 | 57.15 | 56.87 |
| Charge 2 |  |  |  |
| Acrylic polyketone of Example 10 | 20.0 | 19.87 | 19.87 |
| Diketone of Example 2 | 20.2 | 20.4 | 20.2 |
| Trixene BI-7960 | 86.28 | 86.1 | 86.0 |
| Charge 3 |  |  |  |
| Epomin SP-003[vii] | 3.3 | — | — |
| Epomin SP-006 | — | 3.5 | — |
| Epomin SP-012[viii] | — | — | 3.7 |
| Dibutyltin dilaurate | 0.3 | 0.3 | 0.3 |
| % NV solids (theoretical) | 58 | 58 | 58.1 |
| Mole ratio 1 (amine:CO) | 1:1 | 1:1 | 1:1 |
| Mole ratio 2 (NCO:amine) | 3:1 | 3:1 | 3:1 |

[vii]A polyamine available from Nippon Shokubai Co LTD, with a reported molecular weight of 300 g/mole and amine (primary and secondary) equivalent weight of 48 g/mole.
[viii]polyamine available from Nippon Shokubai Co LTD, with a reported molecular weight of 1200 g/mole and amine (primary and secondary) equivalent weight of 53 g/mole.

The following Table 7 describes the preparation of compositions with varying carbonyl functional components.

TABLE 7

|  | Ex. 28 | Ex. 29 | Ex. 30 | Ex. 31 | Ex. 32 | Ex. 33 |
|---|---|---|---|---|---|---|
| Charge 1 |  |  |  |  |  |  |
| Photochromic dyes | 6.01 | 6.01 | 6.01 | 5.99 | 6.01 | 6.01 |
| TINUVIN ® 144 | 2.00 | 2.00 | 2.00 | 1.99 | 2.00 | 2.00 |
| IRGANOX ® 245 | 2.00 | 2.00 | 2.00 | 1.99 | 2.00 | 2.00 |
| (3-Glycidoxypropyl) trimethoxysilane | 4.50 | 4.50 | 4.50 | 4.50 | 4.50 | 4.50 |
| BYK ® 333 | 0.08 | 0.08 | 0.08 | 0.08 | 0.08 | 0.08 |
| 1-Methyl-2-pyrrolidinone | 52.03 | 51.72 | 70.81 | 142.67 | 36.05 | 34.93 |

TABLE 7-continued

|  | Ex. 28 | Ex. 29 | Ex. 30 | Ex. 31 | Ex. 32 | Ex. 33 |
|---|---|---|---|---|---|---|
| Charge 2 |  |  |  |  |  |  |
| Acrylic polyketone of Example 10 | 6.12 | 16.12 | 11.87 | 7.0 | 12.5 | — |
| Polyketone of Example 9 | — | — | — | — | — | 5.4 |
| Dialdehyde of Example 4 | — | — | — | — | 26.7 | — |
| Ketone of Example 5 | — | — | — | 22.5 | — | — |
| Acetoacetate of Example 6 | 33.5 | — | — | — | — | 26.3 |
| Diacetoacetate of Example 7 | — | 25.6 | — | — | — | — |
| Polyketone of Example 8 | — | — | 24.3 | — | — | — |
| Trixene BI-7960 | 83.14 | 83.0 | 89.28 | 97.14 | 85.57 | 89.71 |
| Charge 3 |  |  |  |  |  |  |
| Epomin SP-006 | 3.4 | 3.4 | 3.6 | 3.9 | 3.5 | 5.4 |
| Dibutyltin dilaurate | 0.3 | 0.3 | 0.3 | 0.3 | 0.3 | 0.3 |
| % NV solids (theoretical) | 59.5 | 60 | 54 | 50 | 58 | 65 |
| Mole ratio 1 (amine:CO) | 2:1 | 1:1 | 2:1 | 2:1 | 1:1 | 2:1 |
| Mole ratio 2 (NCO:amine) | 3:1 | 3:1 | 3:1 | 3:1 | 3:1 | 2:1 |

Part 3. Preparation of Photochromic Test Specimens

The compositions of Examples 11 through 33 were applied to PDQ® coated Gentex® polycarbonate plano lenses, each having a diameter of 76 millimeters. Prior to coating, each lens was treated with corona using Tantec equipment with 70 KV and 1000 W settings. About 1-2 mL of each composition was dispensed onto the substrate and then rotated for eight seconds at a spin speed sufficient to deposit 0.28-0.4 g of wet coating onto the lens for all of the Examples 11 through 33.

The test specimens of Examples 11 through 16 were prepared as one set and the Examples 17 through 33 were prepared in duplicate, then cured at 125° C. for 1 hour in a forced air oven. All of the coated and cured samples exhibited transparent coatings that were free of visible haze.

Part 4. Properties of Test Specimens

Part 4a. Micro Hardness Evaluation

One set of test specimens were subjected to an additional thermal cure for three hours at 105° C. and set aside for hardness measurements. These specimens were then subjected to micro-hardness testing using a Fischerscope HCV, Model H100SMC available from Fischer Technology, Inc. The hardness was measured at a penetration depth of 2 microns after a 100 mNewton load for 15 seconds. Each test specimen was measured at least twice and the resulting data was averaged. Results for non-photochromic coatings are shown in Table 8 below. Photochromic coating results are shown in Tables 9-14 in Part 4b.

TABLE 8

| Example | Fischer micro-hardness (N/mm$^2$) | Amine:CO Mole ratio | NCO:amine Mole ratio |
|---|---|---|---|
| 11 | 134 | 4:1 | 3:1 |
| 12 | 74 | 4:1 | 3:1 |
| 13 | 76 | 2:1 | 3:1 |
| CE. 14 | 12 | 2:1 | 0:1 |
| CE. 15 | 148 | 2:0 | 3:1 |
| CE. 16 | 5 | 0:1 | 3:0 |

As shown in Table 8, Examples 11-13 demonstrate that cured coatings with acceptable hardness (>25 N/mm$^2$) are provided via formulations containing polyamine, polyiso-cyanate, and various combinations of high and/or low equivalent weight carbonyl compounds. As compared to Example 13, the omission of the polyisocyanate component or the polyamine component results in coatings that are not adequately crosslinked and are very soft and tacky (see CE 14 and 16, respectively). The omission of the polycarbonyl component results in a very hard coating (see CE-15).

Part 4b. Photochromic Performance

The second set of test specimens (Examples 17-33) were further treated with corona as previously described and spin coated with a protective coating according to the formulation reported in Table 1 of Example 1 in U.S. Pat. No. 7,410,691. The test specimens were cured in a UV oven equipped with D bulbs. Following this, each test specimen was thermally cured at 105° C. for three hours.

The photochromic performance of the test specimens was tested on the Bench for Measuring Photochromics ("BMP") made by Essilor, Ltd. France. The BMP was maintained at a constant temperature of 73.4° F. (23° C.) during testing. Prior to testing, each of the coated test specimens were exposed to 365-nanometer ultraviolet light for about 10 minutes at a distance of about 14 centimeters to activate the photochromic materials. The UVA (315 to 380 nm) irradiance at the lens was measured with a LICOR® Model Li-1800 spectroradiometer and found to be 22.2 watts per square meter. Each test specimen was then placed under a 500 watt, high intensity halogen lamp for about 10 minutes at a distance of about 36 centimeters to bleach (inactivate) the photochromic materials. The illuminance at the specimen was measured with the LICOR® spectroradiometer and found to be 21.9 Klux. Each test specimen was then kept in a dark environment at room temperature (from 70 to 75° F., or 21 to 24° C.) for at least one hour prior to testing on the BMP. Prior to measurement, each lens was measured for ultraviolet absorbance at 390 nanometers (Abs 390 nm).

The BMP optical bench was fitted with two 150-watt Newport Model #6255 Xenon arc lamps set at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch (5.08 cm×5.08 cm) 50% polka dot beam splitter set at 45° to each lamp is used to mix the two beams. The combination of neutral density filters and voltage control of the Xenon arc lamp were used to adjust the intensity of the irradiance. Software i.e., BMPSoft version 2.1e was used on the BMP to control timing, irradiance, air cell and sample temperature, shuttering, filter selection, and response measurement. A ZEISS® spectrophotometer, Model MCS 601, with fiber optic cables for light delivery through the lens was used for response and color measurement. Photopic response measurements were collected on each lens.

The power output of the optical bench, i.e., the dosage of light that the lens was exposed to, was adjusted to 6.7 watts per square meter (W/m$^2$) UVA, integrated from 315-380 nm, and 50 Klux illuminance, integrated from 380-780 nm. Measurement of this power set point was made using an irradiance probe and the calibrated Zeiss spectrophotometer. The lens sample cell was fitted with a quartz window and self-centering sample holder. The temperature in the sample cell was controlled at 23° C. through the software with a modified Facis, Model FX-10, environment simulator. Measurement of the sample's dynamic photochromic response and color measurements were made using the same Zeiss spectrophotometer with fiber optic cables for light delivery from a tungsten halogen lamp through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was ≈30° from perpendicular.

Response measurements, in terms of a change in optical density (ΔOD) from the unactivated or bleached state to the activated or colored state, were determined by establishing the initial unactivated transmittance, opening the shutter from the Xenon lamp(s) and measuring the transmittance through activation at selected intervals of time. Change in optical density was determined according to the formula: $\Delta OD = \log_{10}(\% \ Tb/\% \ Ta)$, where % $T_b$ is the percent transmittance in the bleached state and % $T_a$ is the percent transmittance in the activated state. Optical density measurements were based on photopic optical density.

The results of the micro-hardness and photochromic performance for Examples 17 through 33 are shown in Tables 9 to 14 below. The ΔOD at saturation was measured after 15 minutes of activation and the Fade Half Life ("T½") value was the time interval in seconds for the ΔOD of the activated form of the photochromic material in the coating to reach one half the fifteen-minute ΔOD at 73.4° F. (23° C.), after removal of the activating light source.

TABLE 9

Effect of combination of carbonyl materials (i) vs. (i) and (ii)

| Example | Fischer micro-hardness (N/mm$^2$) | ΔOD | T½ @ Photopic (seconds) | Amine:CO Mole ratio | NCO:amine Mole ratio |
|---|---|---|---|---|---|
| 17 | 64 | 0.86 | 52 | 4:1 | 3:1 |
| 18 | 67 | 0.86 | 54 | 2:1 | 3:1 |

Comparable photochromic performance and hardness are demonstrated with only a high equivalent weight dicarbonyl (Example 17) and a combination high and low equivalent weight carbonyl materials (Example 18).

TABLE 10

| | Varying ratio of high equivalent weight carbonyl (i) to low equivalent weight carbonyl (ii). | | | | | |
|---|---|---|---|---|---|---|
| Example | Fischer micro-hardness (N/mm²) | ΔOD | T½ @ Photopic (seconds) | Soft CO(i): Hard CO (ii) | Amine: CO Mole ratio | NCO: amine Mole ratio |
| 19 | 42 | 0.85 | 45 | 1:1 | 1:1 | 3:1 |
| 20 | 78 | 0.82 | 64 | 1:4 | 1:1 | 3:1 |

As shown in Table 10, a decrease in the amount of acrylic polyketone (ii) relative to the high equivalent weight carbonyl (i) in the coating improves the photochromic performance in terms of T½, with a lower, but acceptable, hardness.

TABLE 11

| | Varying ratio of amine to carbonyl | | | | |
|---|---|---|---|---|---|
| Example | Fischer micro-hardness (N/mm²) | ΔOD | T½ @ Photopic (seconds) | Amine:CO Mole ratio | NCO:amine Mole ratio |
| 21 | 43 | 0.84 | 56 | 1:1 | 3:1 |
| 22 | 80 | 0.84 | 60 | 2:1 | 3:1 |

As shown in Table 11, a higher amine to carbonyl ratio results in a harder coating without impacting photochromic performance.

TABLE 12

| | Varying ratio of isocyanate to amine components | | | | |
|---|---|---|---|---|---|
| Example | Fischer micro-hardness (N/mm²) | ΔOD | T½ @ Photopic (seconds) | Amine:CO Mole ratio | NCO:amine Mole ratio |
| 23 | 66 | 0.82 | 52 | 1:1 | 3:1 |
| 24 | 84 | 0.80 | 60 | 1:1 | 6:1 |

As shown in Table 12, a higher isocyanate to amine ratio results in a harder coating with only a minor impact on photochromic performance.

TABLE 13

| | Varying amine molecular weight | | | | | |
|---|---|---|---|---|---|---|
| Example | Fischer micro-hardness (N/mm²) | ΔOD | T½ @ Photopic (seconds) | Amine: CO Mole ratio | NCO: amine Mole ratio | Amine Mw (g/mole) |
| 25 | 63 | 0.70 | 69 | 1:1 | 3:1 | 300 |
| 26 | 66 | 0.82 | 52 | 1:1 | 3:1 | 600 |
| 27 | 68 | 0.83 | 54 | 1:1 | 3:1 | 1200 |

As shown in Table 13, Examples 25-27 demonstrated that amines of similar equivalent weight gave similar hardness regardless of the molecular weight.

TABLE 14

| | Additional examples using different carbonyl components (i) and (ii) and varying carbonyl functionality | | | | |
|---|---|---|---|---|---|
| Example | Fischer micro-hardness (N/mm²) | ΔOD | T½ @ Photopic (seconds) | Amine: CO Mole ratio | NCO: amine Mole ratio |
| 28 | 35 | 0.90 | 51 | 2:1 | 3:1 |
| 29 | 54 | 0.87 | 88 | 1:1 | 3:1 |
| 30 | 60 | 0.87 | 53 | 2:1 | 3:1 |
| 31 | 31 | 0.93 | 72 | 2:1 | 3:1 |
| 32 | 53 | 0.91 | 125 | 1:1 | 3:1 |
| 33 | 41 | 0.94 | 54 | 2:1 | 2:1 |

Table 14 demonstrates that hardness and photochromic performance can be fine-tuned by introducing variations in carbonyl components (i) and (ii) including functionality, reactivity of carbonyl, molecular weight, branching and backbone chemistries, such as polyester, polyurethane and polycarbonate.

Part 4C: Thermal Analysis—Differential Scanning Calorimetry Data

Using the coating of Example 19, a film was prepared on polypropylene sheet for thermal analysis using differential scanning calorimetry (DSC). The sample was sealed in an aluminum hermetic pan and scanned in a TAI Discovery DSC. The temperature cycle chosen was from −75 to 125° C. with a heating rate of 20° C./minute. As shown by the DSC results below in Table 15, the photochromic film prepared from Example 19 shows one peak at a low glass transition temperature (Tg) (peak1: negative number) and another peak at high Tg (peak2: positive number) indicating separation between hard and soft polymer domains. These results are suggestive of a phase separated system, in which most of the photochromic dyes may reside in the soft polymer domains providing good photochromic performance (T½) while the hard polymer domains provide the hardness to the coating.

TABLE 15

| Example | Peak 1 (Tg) | Peak 1 description | Peak 2 (Tg) | Peak 2 description | Fischer micro-hardness (N/mm²) | T½ @ Photopic (seconds) |
|---|---|---|---|---|---|---|
| 19 | −47° C. | Major peak | 48° C. | Major peak | 42 | 45 |

While specific embodiments of the present invention have been described in detail, it will be appreciated by those skilled in the art that various modifications and alternatives to those details could be developed in light of the overall teachings of the disclosure. Accordingly, the particular embodiments disclosed herein are intended to be illustrative only and not limiting as to the scope of the invention which is to be given the full breadth of the claims appended and any and all equivalents thereof.

The invention claimed is:

1. A curable composition, comprising:
(a) a component comprising one or more carbonyl group-containing compounds having a number average molecular weight (Mn) of at least 500 g/mole, wherein each carbonyl group is independently a ketone group or an aldehyde group, wherein the component (a) comprises (i) a compound having 1 to 4 carbonyl groups per molecule and an equivalent weight of 500 to 30,000 g/mole, wherein the compound (i) is selected from the group consisting of carbonyl group-containing polycarbonates, carbonyl group-containing polyethers, carbonyl group-containing polyesters, copolymers thereof, and mixtures thereof;

(b) a polyamine compound having at least two primary amine groups per molecule; and (c) a polyisocyanate compound, wherein the polyisocyanate compound has at least two isocyanate groups per molecule and an equivalent weight of less than or equal to 500 g/mole.

2. The curable composition of claim 1, wherein the component (a) further comprises:

(ii) a compound having 2 or more carbonyl groups per molecule and an equivalent weight of 130 to 480 g/mole.

3. The curable composition of claim 1, wherein the polyamine compound (b) has a number average molecular weight of at least 60 g/mole and an equivalent weight based on the sum of primary and secondary amine groups present of at least 30 g/mole.

4. The curable composition of claim 1, further comprising a photochromic compound.

5. The curable composition of claim 4, wherein the photochromic compound is selected from the group consisting of naphthopyrans, benzopyrans, phenanthropyrans, indenonaphthopyrans, spiro(indoline)naphthoxazines, spiro(indoline)pyridobenzoxazines, spiro(benzindoline)pyridobenzoxazines, spiro(benzindoline)naphthoxazines, spiro(indoline)-benzoxazines, fulgides, fulgimides, diarylethenes, and mixtures thereof.

6. The curable composition of claim 1, wherein the mole ratio of total combined primary and secondary amine group equivalents of polyamine compound (b) to total carbonyl group equivalents of component (a) is at least 1:1.

7. The curable composition of claim 1, wherein the mole ratio of isocyanate equivalents of polyisocyanate compound (c) to total combined primary and secondary amine group equivalents of polyamine compound (b) is at least 1:1.

8. The curable composition of claim 1, wherein the curable composition is selected from a curable coating composition and a curable adhesive composition.

9. The curable composition of claim 1, wherein the composition further comprises a material selected from the group consisting of antioxidants, hindered amine light stabilizers, ultraviolet light stabilizers, plasticizers, thermoplastics, flow control agents, surfactants, adhesion promoters, solvents, fixed-tint dyes, and mixtures thereof.

10. A coated article comprising:

a substrate; and a cured coating layer over at least a portion of the substrate, wherein the cured coating layer is formed from a curable coating composition comprising:

(a) a component comprising one or more carbonyl group-containing compounds having a number average molecular weight (Mn) of at least 500 g/mole, wherein each carbonyl group is independently a ketone group or an aldehyde group, wherein the component (a) comprises a compound having 1 to 4 carbonyl groups per molecule and an equivalent weight of 500 to 30,000 g/mole, wherein said compound is selected from the group consisting of carbonyl group-containing polycarbonates, carbonyl group-containing polyethers, carbonyl group-containing polyesters, copolymers thereof, and mixtures thereof;

(b) a polyamine compound having at least two primary amine groups per molecule; and (c) a polyisocyanate compound, wherein the polyisocyanate compound has at least two isocyanate groups per molecule and an equivalent weight of less than or equal to 500 g/mole.

11. The coated article of claim 10, wherein the curable coating composition comprises a photochromic compound.

12. The coated article of claim 10, wherein the coated article is selected from an optical article, a display element, a mirror, or a window.

13. The coated article of claim 12, wherein the optical article is a lens.

* * * * *